United States Patent
Hamada et al.

(10) Patent No.: US 9,533,377 B2
(45) Date of Patent: Jan. 3, 2017

(54) WELD BEAD SHAPING APPARATUS AND WELD BEAD SHAPING METHOD

(71) Applicant: KABUSHIKI KAISHA TOSHIBA, Minato-Ku (JP)

(72) Inventors: Takashi Hamada, Yokohama (JP); Tsuyoshi Kato, Chiba (JP); Kazuo Aoyama, Ota-Ku (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 300 days.

(21) Appl. No.: 14/364,571

(22) PCT Filed: Dec. 11, 2012

(86) PCT No.: PCT/JP2012/082071
§ 371 (c)(1),
(2) Date: Jun. 11, 2014

(87) PCT Pub. No.: WO2013/089101
PCT Pub. Date: Jun. 20, 2013

(65) Prior Publication Data
US 2014/0332504 A1  Nov. 13, 2014

(30) Foreign Application Priority Data

Dec. 13, 2011 (JP) .................... 2011-272223

(51) Int. Cl.
B23K 10/00 (2006.01)
B23K 31/00 (2006.01)
(Continued)

(52) U.S. Cl.
CPC ............ *B23K 31/003* (2013.01); *B23K 9/095* (2013.01); *B23K 9/12* (2013.01); *B23K 9/32* (2013.01);
(Continued)

(58) Field of Classification Search
CPC ....... B23K 31/003; B23K 31/00; B23K 9/095; B23K 9/32; B23K 10/003; B23K 10/006; B23K 37/0235; B23K 31/125; B23K 2201/001; B23K 9/12; B23K 10/00; Y10S 901/03; Y10S 901/09; C21D 9/50; C21D 9/505
(Continued)

(56) References Cited

U.S. PATENT DOCUMENTS

2013/0098971 A1* 4/2013 Ohdake ................ B23K 9/1272
228/7
2014/0042208 A1* 2/2014 Uchida .................. B23K 31/02
228/103

FOREIGN PATENT DOCUMENTS

JP  57-017372  1/1982
JP  05-038581  2/1993
(Continued)

OTHER PUBLICATIONS

International Preliminary Report on Patentability issued Jun. 17, 2014 in PCT/JP2012/082071 field Dec. 11, 2012(English translation only).

(Continued)

*Primary Examiner* — Mark Paschall
(74) *Attorney, Agent, or Firm* — Oblon, McClelland, Maier & Neustadt, L.L.P.

(57) ABSTRACT

A weld bead shaping apparatus including: a gouging torch for gouging an object to be shaped; a shape sensor for measuring a shape of the object; a slider apparatus and an articulated robot for driving the gouging torch and shape sensor; an image processing apparatus; and a robot controlling apparatus. The image processing apparatus includes: a shape data extracting unit extracting shape data of the object, from a measurement result obtained by the shape sensor; and a weld reinforcement shape extracting/removal depth cal-
(Continued)

culating unit calculating a weld reinforcement shape of the weld bead from a difference between the shape data and a preset designated shape of the object, and calculating a removal depth by which gouging is performed, based on the weld reinforcement shape. The robot controlling apparatus controls the slider apparatus, the articulated robot, and the gouging torch based on the weld reinforcement shape and the removal depth.

9 Claims, 11 Drawing Sheets

(51) Int. Cl.
*B23K 9/095* (2006.01)
*B23K 9/32* (2006.01)
*B23K 37/02* (2006.01)
*B23K 31/12* (2006.01)
*B23K 9/12* (2006.01)
*C21D 9/50* (2006.01)

(52) U.S. Cl.
CPC ............. *B23K 10/00* (2013.01); *B23K 10/003* (2013.01); *B23K 10/006* (2013.01); *B23K 31/00* (2013.01); *B23K 31/125* (2013.01); *B23K 37/0235* (2013.01); *B23K 2201/001* (2013.01); *C21D 9/50* (2013.01); *C21D 9/505* (2013.01); *Y10S 901/03* (2013.01); *Y10S 901/09* (2013.01); *Y10S 901/42* (2013.01)

(58) Field of Classification Search
USPC .................. 219/121.37, 121.56, 121.58, 121.54, 219/121.45, 121.46, 121.59
See application file for complete search history.

(56) References Cited

FOREIGN PATENT DOCUMENTS

| | | |
|---|---|---|
| JP | 06-114553 | 4/1994 |
| JP | 06-285762 | 10/1994 |
| JP | 07-001148 | 1/1995 |
| JP | 10-211578 | 8/1998 |
| JP | 2002-283099 | 10/2002 |
| WO | 2011/102142 | 8/2011 |

OTHER PUBLICATIONS

Written Opinion issued Feb. 12, 2013 in PCT/JP2012/082071 field Dec. 11, 2012 (English translation only).

International Search Report Issued Feb. 12, 2013 in PCT/JP12/082071 filed Dec. 11, 2012.

* cited by examiner

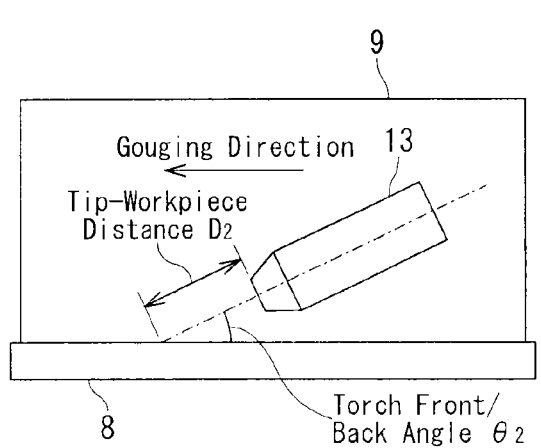
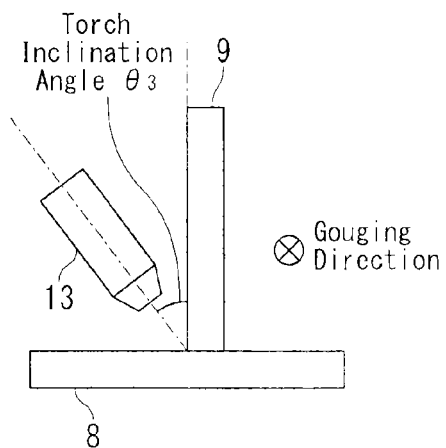
FIG. 5A    FIG. 5B
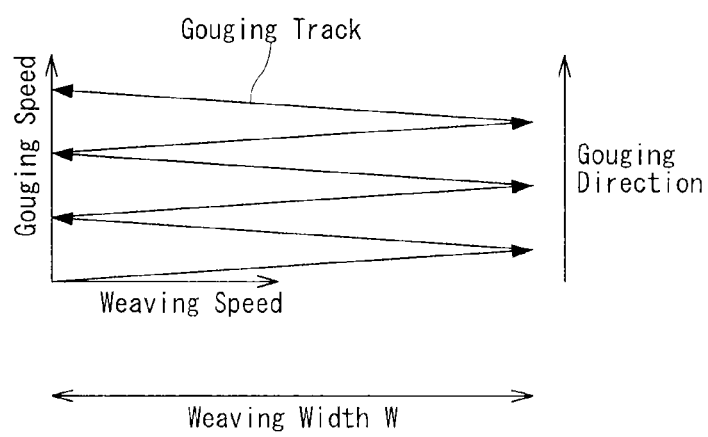
FIG. 6

| Tip Diameter [mm] | DIAMETER 3.5 |
|---|---|
| Tip-Workpiece Distance [mm] | 30 |
| Cooling Gas | Ar |
| Cooling Gas Pressure [kg/cm$^2$] | 45 |
| Plasma Gas | 65%Ar − 35%H$_2$ |
| Plasma Gas Pressure [kg/cm$^2$] | 3.55 |
FIG. 7
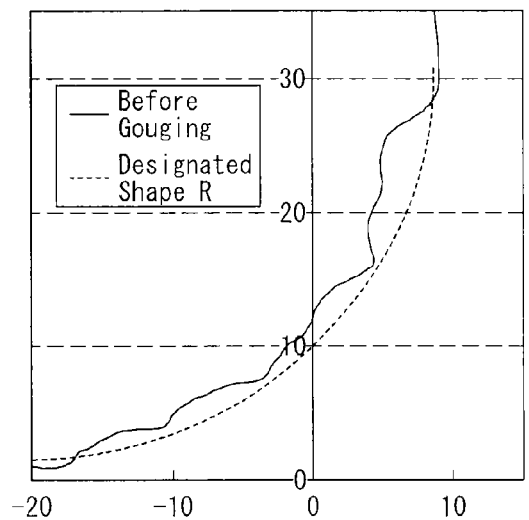
FIG. 8A
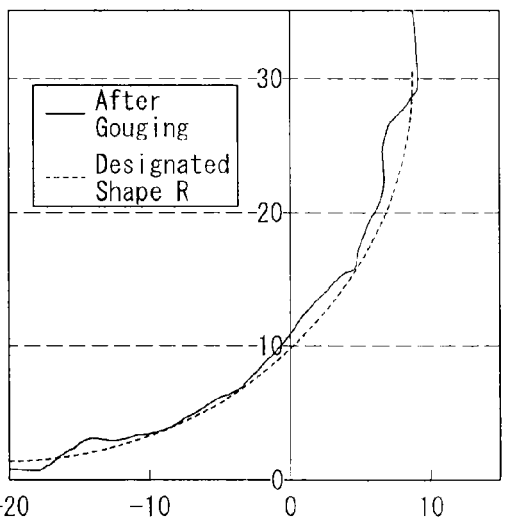
FIG. 8B

WELD BEAD SHAPING APPARATUS AND WELD BEAD SHAPING METHOD

TECHNICAL FIELD

The present invention relates to a weld bead shaping apparatus and a weld bead shaping method for shaping of a weld bead formed along a weld line.

BACKGROUND ART

An installation having a large-size complicated structure, such as a hydraulic turbine runner of a hydraulic power generator, is difficult to manufacture from one article of cast metal. Hence, the installation is formed from a plurality of parts, and these parts are joined to each other by welding. In the hydraulic turbine runner, a welded portion surface is used as a flow passage, and hence a vortex flow occurs on an unshaped welded surface after the joint, resulting in an increase in loss.

In order to make a welded surface smooth, the welded surface is shaped by manual grinding. Unfortunately, this grinding work is performed in a bad environment in which a worker is exposed to dust and needs to use a vibratory tool. Further, a complicated installation has a narrow portion, and hence a large amount of labor (for example, the worker needs to hold a posture with low workability) is imposed on the worker.

In view of these situations, a plasma gouging apparatus has been proposed as a shaping method that replaces such grinding of a welded portion (see Patent Document 1). The plasma gouging apparatus uses a gouging speed and voltage as parameters to be controlled.

An automatic gouging apparatus has been also proposed as a method that replaces such grinding of a large-size complicated installation (see Patent Document 2). The automatic gouging apparatus calculates a removing amount of excess thickness by means of: an apparatus that measures an exemplary shape using an excess thickness detecting stylus and stores the exemplary shape as a reference shape; and a calculating apparatus that compares a shape of an object to be processed with the reference shape and calculates the excess thickness.

Further, the automatic gouging apparatus performs shaping while controlling the removing amount of excess thickness using an arc air gouging torch mounted on a multiaxis slider. In this manner, the automatic gouging apparatus automatically processes the object to be processed into a desired shape.

PRIOR ART DOCUMENTS

Patent Documents

Patent Document 1: Japanese Patent Laid-Open No. 5-38581
Patent Document 2: Japanese Patent Laid-Open No. 57-17372

SUMMARY OF THE INVENTION

Problems to be Solved by the Invention

Unfortunately, the plasma gouging apparatus described in Patent Document 1 is a linear gouging apparatus for back chipping, and thus has a problem of being unsuitable to remove such a large excess thickness of a weld bead of a thick plate. Further, the automatic gouging apparatus described in Patent Document 2 uses the excess thickness detecting stylus to measure an excess thickness shape, and thus has a problem that an error in excess thickness measurement is large and that such a fine irregular shape of a weld bead cannot be measured. Further, the automatic gouging apparatus described in Patent Document 2 performs processing using the arc air gouging, and thus has a problem of being unsuitable to remove a fine excess thickness.

The present invention, which has been made in order to solve the above-mentioned problems, has an object to provide a weld bead shaping apparatus and a weld bead shaping method capable of weld bead shaping with high precision.

Means for Solving the Problems

In order to solve the above-mentioned problems, a weld bead shaping apparatus according to the present invention includes: a shape data extracting unit that extracts shape data of an object to be shaped on which a weld bead is formed, from a measurement result obtained by a shape sensor that measures a shape of the object to be shaped; a weld reinforcement shape extracting/removal depth calculating unit that calculates a weld reinforcement shape of the weld bead from a difference between the shape data and a preset designated shape of the object to be shaped, and calculates a removal depth by which gouging is performed using a gouging torch, on a basis of the weld reinforcement shape; a target position/torch posture calculating unit that calculates a target position and a posture of the gouging torch on a basis of the weld reinforcement shape and the removal depth; a gouging condition calculating unit that calculates a gouging condition on the basis of the weld reinforcement shape and the removal depth; and a driving apparatus that drives the gouging torch and the object to be shaped and a controlling apparatus that controls the gouging torch, on a basis of: the target position and the posture of the gouging torch that are calculated by the target position/torch posture calculating unit; and the gouging condition calculated by the gouging condition calculating unit.

A weld bead shaping method according to the present invention includes: a shape measuring step of measuring a shape of an object to be shaped; a shape data extracting step of extracting shape data of the object to be shaped, on a basis of a measurement result obtained in the shape measuring step; a weld reinforcement shape extracting/removal depth calculating step of calculating a weld reinforcement shape of a weld bead from a difference between the shape data and a preset designated shape of the object to be shaped, and calculating a removal depth by which gouging is performed, from the weld reinforcement shape; a target position/torch posture calculating step of calculating a target position and a posture of a gouging torch on a basis of the weld reinforcement shape and the removal depth; a gouging condition calculating step of calculating a gouging condition on the basis of the weld reinforcement shape and the removal depth; and a controlling step of controlling a driving apparatus that drives the gouging torch for the gouging and the object to be shaped, on a basis of: the target position and the posture of the gouging torch that are calculated in the target position/torch posture calculating step; and the gouging condition calculated in the gouging condition calculating step.

Advantage of the Invention

A weld bead shaping apparatus and a weld bead shaping method according to the present invention are capable of weld bead shaping with high precision.

BRIEF DESCRIPTION OF THE DRAWINGS

FIG. 5 are explanatory views respectively showing a torch front/back angle and a torch inclination angle.

FIG. 6 is an explanatory view showing a gouging direction, a weaving width, and the like.

FIG. 7 is a table showing conditions that are used as an example for the bead shaping on the blade welded portion of the hydraulic turbine runner.

FIG. 8A is a graph showing a cross-sectional shape (solid line) and a designated shape (dotted line) before gouging of the blade welded portion, and FIG. 8B is a graph showing a cross-sectional shape (solid line) and a designated shape (dotted line) after the gouging thereof.

DESCRIPTION OF EMBODIMENTS

Embodiments of a weld bead shaping apparatus and a weld bead shaping method according to the present invention are described with reference to the attached drawings. In the following embodiments, description is given of an example in which the weld bead shaping apparatus and the weld bead shaping method perform shaping on a weld bead formed in a blade welded portion of a hydraulic turbine runner in a hydraulic power generator having a large-size complicated structure.

First Embodiment

A first embodiment of the weld bead shaping apparatus and the weld bead shaping method according to the present invention will be described with reference to the attached drawings.

Figure 1:
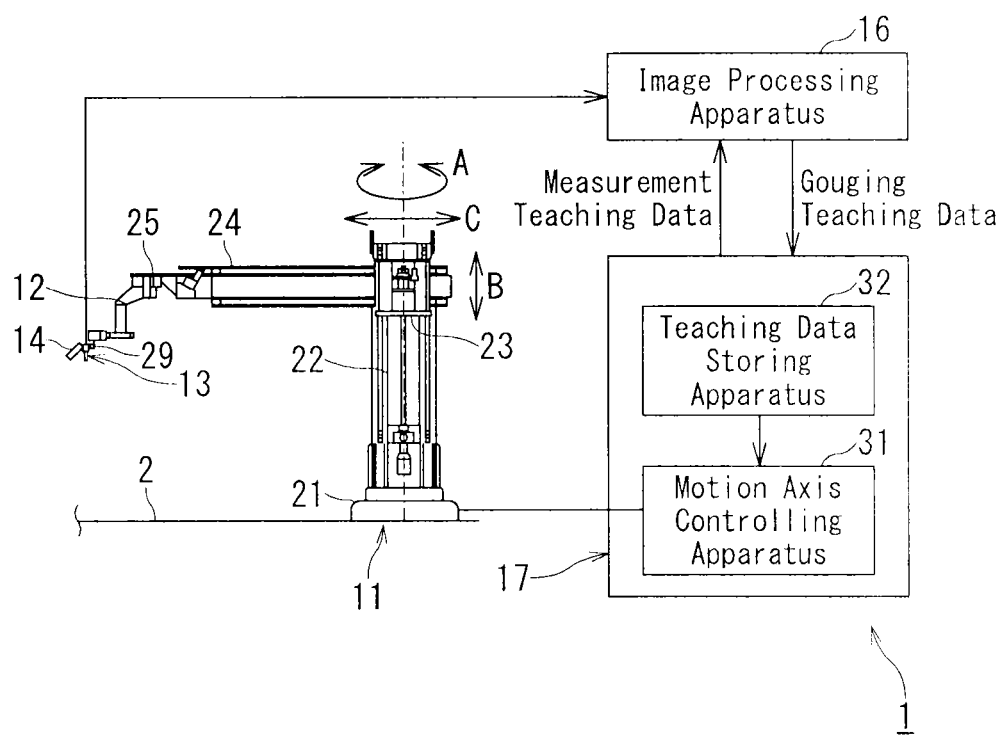
FIG. 1 is a configuration diagram of a weld bead shaping apparatus according to a first embodiment.

FIG. 1 is a configuration diagram of a weld bead shaping apparatus 1 according to the first embodiment.

The weld bead shaping apparatus 1 includes a slider apparatus 11, an articulated robot 12, a plasma gouging torch 13, a shape sensor 14, an image processing apparatus 16, and a robot controlling apparatus 17.

The slider apparatus 11 includes a pedestal 21, a support pillar 22, an elevating slide 23, a side arm 24, and a base 25. The pedestal 21 is installed on an installation surface 2 of the slider apparatus 11, and supports the slider apparatus 11. The support pillar 22 extends upward from the pedestal 21, and rotates about a vertical axis (an arrow A direction in FIG. 1). The elevating slide 23 is provided to the support pillar 22, and slides with respect to the support pillar 22 in a vertical direction (an arrow B direction in FIG. 1). The side arm 24 is provided to the elevating slide 23, and moves with respect to the elevating slide 23 in a horizontal uniaxial direction (an arrow C direction in FIG. 1). The base 25 is provided to one end (leading end) of the side arm 24.

The articulated robot 12 is attached to the base 25, and includes an arm that multiaxially rotates at its multiple joints. The articulated robot 12 includes, for example, six joints, and rotates about six axes. In a case where the articulated robot 12 includes the six joints, first to sixth linkages are respectively placed at the first to sixth joints. The first joint is placed on the base 25, and a leading end of the sixth linkage corresponds to a leading end of the arm.

The slider apparatus 11 and the articulated robot 12 are a driving apparatus that drives the plasma gouging torch 13 and the shape sensor 14.

The plasma gouging torch 13 is provided to the arm leading end of the articulated robot 12, and gouges an object to be shaped on which a weld bead is formed. A position and posture of the plasma gouging torch 13 are adjusted by: an articulated mechanism of the articulated robot 12; and position adjustment achieved by vertical and horizontal movements of the slider apparatus 11 and a rotation thereof about the vertical axis. The plasma gouging torch 13 includes a nozzle 29. The nozzle 29 jets plasma gas for gouging the weld bead and cooling gas for removing slag generated during the gouging. A removing amount of the slag is increased and decreased by changing a pressure of the cooling gas.

The shape sensor 14 is provided to the arm leading end of the articulated robot 12. The shape sensor 14 is a sensor that measures a three-dimensional shape of the object to be shaped using, for example, a laser beam or ultrasonic waves.

These plasma gouging torch 13 and the shape sensor 14 are attached to the arm leading end of the articulated robot 12 with a relative position therebetween being fixed.

The image processing apparatus 16 receives and processes measurement data measured and outputted by the shape sensor 14. The image processing apparatus 16 transmits gouging teaching data obtained on a basis of the measurement data, to the robot controlling apparatus 17.

The robot controlling apparatus 17 (controlling apparatus) includes a motion axis controlling apparatus 31 and a teaching data storing apparatus 32. The motion axis controlling apparatus 31 transmits command signals to the slider apparatus 11 and the articulated robot 12, and drives the slider apparatus 11 and the articulated robot 12 by predetermined amounts. The teaching data storing apparatus 32 stores measurement teaching data, and transmits the measurement teaching data to the image processing apparatus 16. The robot controlling apparatus 17 further includes an operation apparatus for enabling an operator to operate the slider apparatus 11 and the articulated robot 12. Further, the robot controlling apparatus 17 controls a gouging power supply of the gouging torch 13 and the like.

Next, an action (function) of the weld bead shaping apparatus 1 and the weld bead shaping method according to the first embodiment will be described.

Figure 2:
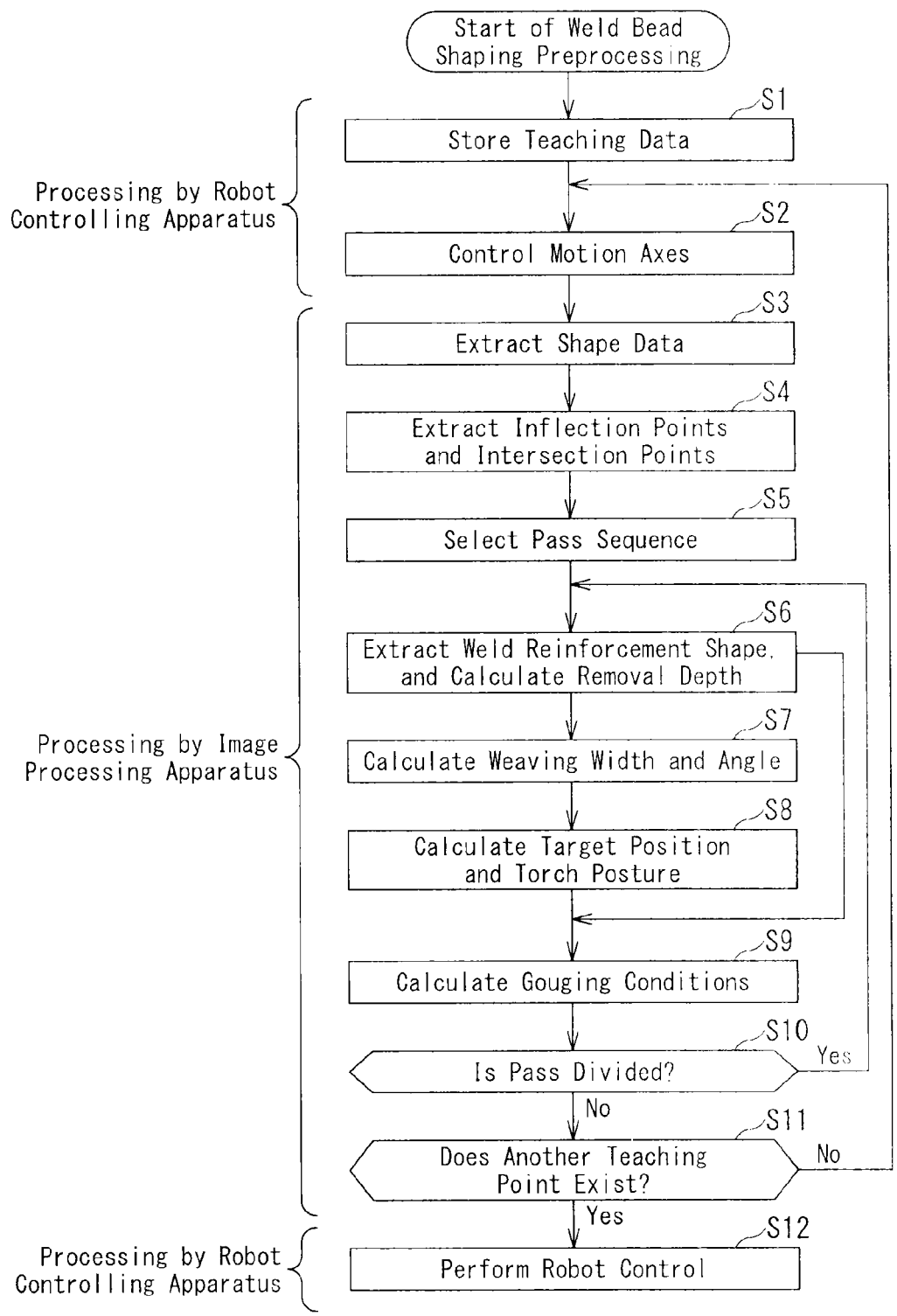
FIG. 2 is a flow chart for describing weld bead shaping preprocessing carried out by the weld bead shaping apparatus according to the first embodiment.

FIG. 2 is a flow chart for describing weld bead shaping preprocessing carried out by the weld bead shaping apparatus 1 according to the first embodiment.

Figure 3:
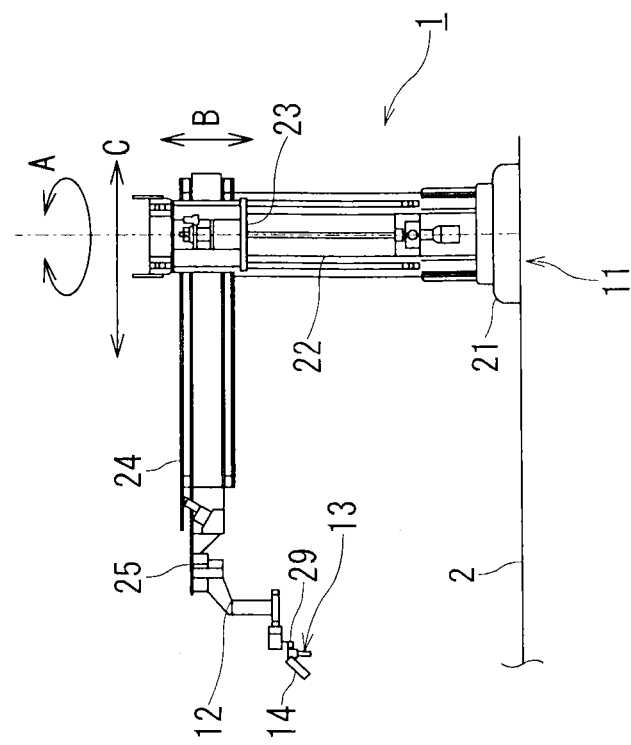
FIG. 3 is an explanatory view when the weld bead shaping apparatus according to the first embodiment performs weld bead shaping on a blade welded portion of a hydraulic turbine runner.
Figure 3:
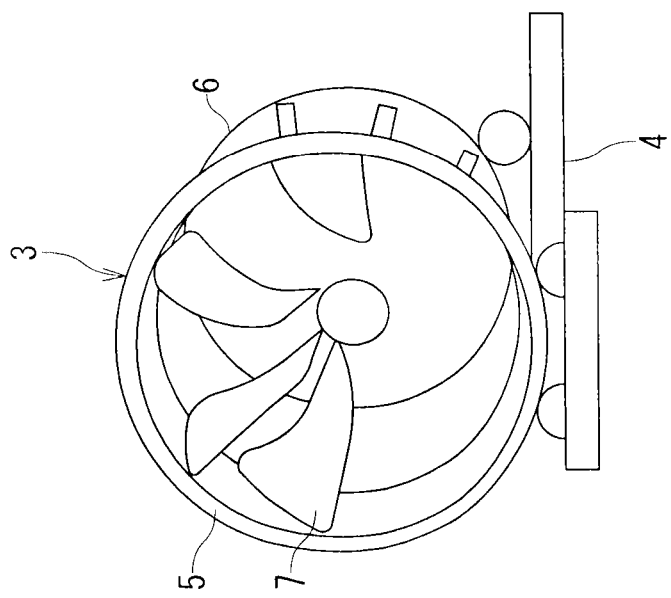

FIG. 3 is an explanatory view when the weld bead shaping apparatus 1 according to the first embodiment performs weld bead shaping on a blade welded portion of a hydraulic turbine runner 3.

The weld bead shaping preprocessing carried out by the weld bead shaping apparatus 1 is divided into processing steps (Steps S1, S2, and S12) carried out by the robot controlling apparatus 17 and processing steps (Steps S3 to S11) carried out by the image processing apparatus 16.

Before a start of the weld bead shaping preprocessing, the weld bead shaping apparatus 1 and the hydraulic turbine runner 3 as an object to be shaped are installed. The hydraulic turbine runner 3 is hoisted by a crane into a standing state, and is installed onto a turning roller 4 as shown in FIG. 3. The hydraulic turbine runner 3 rotates so as to follow rotations of the turning roller 4. The hydraulic turbine runner 3 is stopped at an angle at which a welded portion (portion to be shaped) between: a crown 5 and a band 6; and a blade 7 is located in front of the weld bead shaping apparatus 1.

The weld bead shaping apparatus 1 is installed lateral to an opening of the hydraulic turbine runner 3. After that, the slider apparatus 11 and the articulated robot 12 are operated by the motion axis controlling apparatus 31 of the robot controlling apparatus 17.

The portion to be shaped that is the welded portion between: the crown 5 and the band 6; and the blade 7 of the hydraulic turbine runner 3 will be used as a flow passage, and thus needs to be finished into a smooth round shape. The smooth round shape that is an ideal shape at the time of the finish of the object to be shaped is given as a preset designated shape of the object to be shaped.

In a teaching data storing step S1, the teaching data storing apparatus 32 stores teaching data. The teaching data is stored into the teaching data storing apparatus 32 by, for example, an operation of the operator. The operator drives the slider apparatus 11 and the articulated robot 12 by means of the operation apparatus of the robot controlling apparatus 17. The shape sensor 14 (or the plasma gouging torch 13) moves to a teaching point on a gouging scheduled track. If the operator selects a teaching operation, a position of the slider apparatus 11 and a posture of the articulated robot 12 are stored as the teaching data into the teaching data storing apparatus 32.

The teaching data is a motion command including: position/posture data indicating a target position and a torch posture of the shape sensor 14 and the plasma gouging torch 13; and gouging conditions. The gouging conditions are given for each interval between teaching points, and include a gouging speed, a weaving frequency, and a current. Further, the teaching data is divided into measurement teaching data used for shape measurement by the shape sensor 14 and gouging teaching data used for gouging by the plasma gouging torch 13.

In a motion axis controlling step S2, the motion axis controlling apparatus 31 controls motion axes of the slider apparatus 11 and the articulated robot 12 on a basis of the measurement teaching data stored in the teaching data storing step S1. The shape sensor 14 measures a shape of the weld bead after motions of the slider apparatus 11 and the articulated robot 12. A shape of the welded portion is measured by the shape sensor 14 attached to the arm leading end of the articulated robot 12.

In a shape data extracting step S3, the image processing apparatus 16 (shape data extracting unit) performs binarization and denoising on the measurement data outputted from the shape sensor 14, and extracts shape data of the weld bead.

In an inflection point/intersection point extracting step S4, the image processing apparatus 16 (inflection point/intersection point extracting unit) superimposes the shape data extracted in the shape data extracting step S3 and the designated shape on an image. The image processing apparatus 16 extracts, as intersection points, points at which the shape data and the designated shape intersect with each other. The image processing apparatus 16 further extracts, as inflection points, points on the shape data on a center point side from the designated shape, that is, apexes of valley portions of the weld bead excessively reinforced with reference to the designated shape. Note that the image processing apparatus 16 defines, as mountain portions, apexes of the weld bead facing the center point of the designated shape, and defines, as valley portions, apexes of the weld bead facing a side opposite to the center point of the designated shape.

FIGS. 4A to 4E are explanatory views for describing a relation of shape data B of the weld bead, a designated shape R, and respective surfaces of the crown 5, the band 6, and the blade 7.

In FIG. 4 (also in FIG. 13 to be described later), the shape data. B (weld bead) extracted in the shape data extracting step S3, the surface of the crown 5, the surface of the band 6, and the surface of the blade 7 are indicated by solid lines, virtual lines E that are extended lines of the surface of the crown 5, the surface of the band 6, and the surface of the blade 7 are indicated by dotted lines, and the designated shape R is indicated by an alternate long and short dash line. Further, a left-right direction of FIG. 4 is defined as an X axis, and a top-bottom direction of FIG. 4 is defined as a Y axis.

Figure 4A:
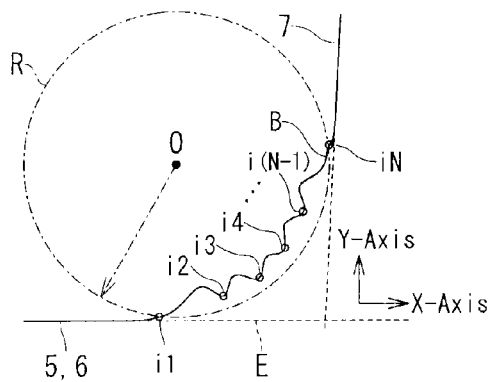
FIGS. 4A to 4E are explanatory views for describing a relation of shape data of a weld bead, a designated shape, and respective surfaces of a crown, a band, and a blade.

As shown in FIG. 4A, the designated shape R is defined as a circle (arc) that is in contact with the extended lines E of the surface of the crown 5 or the surface of the band 6 and the surface of the blade 7 and has a predetermined radius. The image processing apparatus 16 extracts an intersection point i1 and an intersection point iN that are intersection points between the shape data B extracted in the shape data extracting step S3 and the designated shape R. The image processing apparatus 16 extracts inflection points i2 to i(N−1) that are points on the shape data B on a center point O side from the designated shape R and are apexes of valley portions.

Numbers of i1, i2, i3 . . . i(N−1), and iN (N: the total number of the extracted inflection points and intersection points) are assigned to the intersection points and inflection points extracted at this time, in ascending order of X-axial value within the shape data B.

In a pass sequence selecting step S5, the image processing apparatus 16 (pass sequence selecting unit) compares the shape data with the designated shape. In a case where a portion in which reinforcement of the weld bead is insufficient (the weld bead is smaller than the designated shape) exists and where a distance in the portion in which the weld reinforcement is insufficient is more than a predetermined value, the image processing apparatus 16 (pass sequence selecting unit) divides a track (pass sequence) of continuously performed gouging. This prevents the portion in which the weld reinforcement is insufficient from being further gouged. In a case where the number of the obtained intersection points is more than two, the image processing apparatus 16 determines that the portion in which the weld reinforcement is insufficient exists. The image processing apparatus 16 can calculate a distance in the portion in which the weld reinforcement is insufficient, by calculating a distance between adjacent ones of the intersection points.

For example, in a case as shown in FIG. 4A where the number of intersection points on the shape data B is two, the image processing apparatus 16 selects collective gouging between the intersection point i1 to the intersection point iN.

Figure 4B:
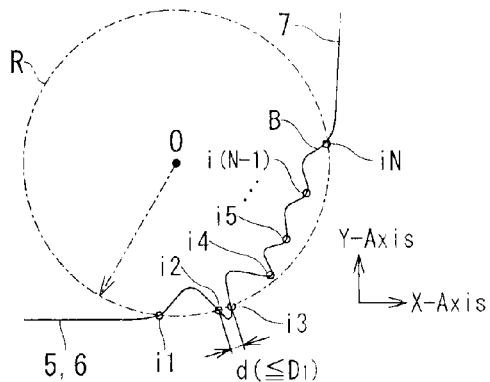

Meanwhile, in a case where the number of intersection points is more than two, the image processing apparatus 16 calculates a distance d between adjacent ones of the intersection points other than the intersection point i1 and the intersection point iN. For example, in a case as shown in FIG. 4B where the distance d between the intersection point i2 and the intersection point i3 other than the intersection point i1 and the intersection point iN is equal to or less than a predetermined value $D_1$, the image processing apparatus 16 selects collective gouging between the intersection point i1 and the intersection point iN. That is, the image processing apparatus 16 sets one pass sequence to between the intersection point i1 and the intersection point iN.

Figure 4C:
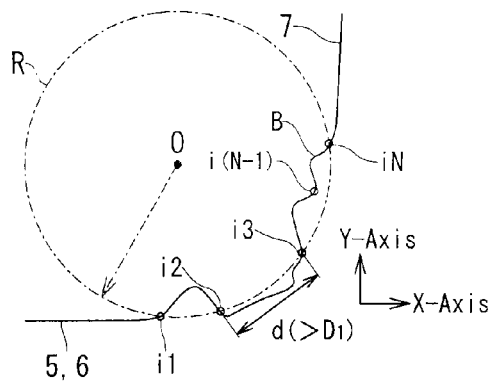

For example, in a case as shown in FIG. 4C where the distance d between the intersection point i2 and the intersection point i3 other than the intersection point i1 and the intersection point iN is more than the predetermined value $D_1$, the image processing apparatus 16 selects division of gouging before and after between the intersection point i2 and the intersection point i3. That is, the image processing apparatus 16 sets a pass sequence 1 to between the intersection point i1 and the intersection point i2, and sets a pass sequence 2 to between the intersection point i3 and the intersection point iN.

In a weld reinforcement shape extracting/removal depth calculating step S6, the image processing apparatus 16 (weld reinforcement shape extracting/removal depth calculating unit) calculates a difference between the shape data and the designated shape as a weld reinforcement shape. The image processing apparatus 16 calculates a maximum weld reinforcement in each weld reinforcement shape between adjacent ones of the intersection points or inflection points, and subtracts an amount of weld reinforcement to be ground thereafter by hand finishing, from an average value of the calculated maximum weld reinforcements, and defines the subtraction result as a removal depth.

Figure 4D:
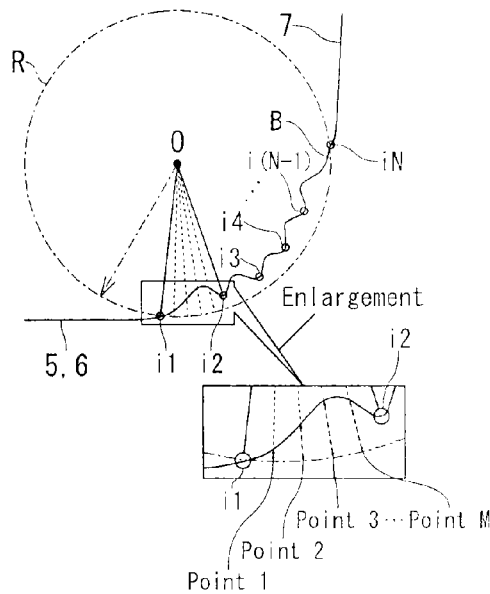

For example, as shown in FIG. 4D, the image processing apparatus 16 calculates a difference between the shape data and the designated shape R, to thereby obtain the weld reinforcement shape. The image processing apparatus 16 obtains, as a weld reinforcement, a maximum value of differences between the shape data B and the designated shape R, between adjacent ones of the intersection points or inflection points extracted in the inflection point/intersection point extracting step S4. For example, the image processing apparatus 16 obtains weld reinforcement shapes at a plurality of points (a point 1 to a point M) between the intersection point i1 and the intersection point i2. The image processing apparatus 16 calculates the weld reinforcement shape at the point 3 as a maximum weld reinforcement. The image processing apparatus 16 obtains an average value of the maximum weld reinforcements respectively obtained between adjacent ones of the intersection point i to the intersection point N, subtracts an amount of weld reinforcement to be ground by hand finishing, from this average value, and defines the subtraction result as a removal depth.

In a case as shown FIG. 4C where the pass sequence is divided, such weld reinforcement shape extraction and such removal depth calculation are performed for each pass sequence.

In a weaving width/angle calculating step S7, the image processing apparatus 16 defines, as a weaving width of the plasma gouging torch 13, a distance between intersection points at both ends of one pass sequence (gouging range) obtained in the pass sequence selecting step S5. The image processing apparatus 16 further defines, as a weaving angle, an angle formed by two straight lines that respectively connect the center point of the designated shape to the intersection points at both the ends.

Figure 4E:
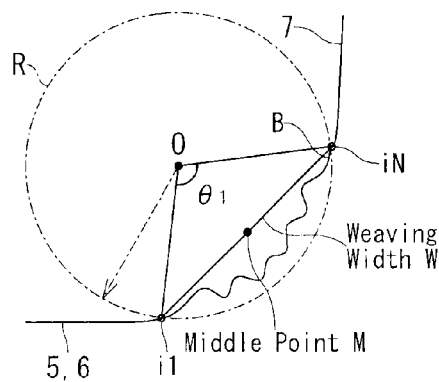

For example, as shown in FIG. 4E, the image processing apparatus 16 defines, as a weaving width W of the plasma gouging torch 13, a distance between the intersection point i1 and the intersection point iN extracted in the inflection point/intersection point extracting step S4. The image processing apparatus 16 further defines, as a weaving angle $\theta_1$, an oscillation angle formed by two straight lines that respectively connect the center point O of the designated shape R to the intersection point i1 and the intersection point iN at both ends.

In a target position/torch posture calculating step S8, the image processing apparatus 16 (target position/torch posture calculating unit) calculates, as a target position, a middle point (a middle point M in FIG. 4E of the weaving width obtained in the weaving width/angle calculating step S7. As shown in FIG. 5A, the target position is a teaching position of a point that is separated by a predetermined tip-workpiece distance $D_2$ from a leading end of the plasma gouging torch 13. The image processing apparatus 16 further calculates such a torch posture of the plasma gouging torch 13 so that a torch front/back angle to a processed surface is always constant and that a torch inclination angle to the designated shape during weaving is always vertical.

FIG. 5 are explanatory views respectively showing the torch front/back angle and the torch inclination angle. FIG. 6 is an explanatory view showing a gouging direction, the weaving width W, and the like.

A torch front/back angle $\theta_2$ is an angle formed by a bottom plate 8 (for example, the crown 5, the band 6) and an axis of the plasma gouging torch 13. A torch inclination angle $\theta_3$ is an angle formed by a standing plate 9 (for example, the blade 7) substantially orthogonal to the bottom plate 8 and the axis of the plasma gouging torch 13. Further, a front/back direction of the torch corresponds to the gouging direction, and the weaving width W is a width corresponding to a direction orthogonal to the gouging direction.

In a gouging condition calculating step S9, the image processing apparatus 16 (gouging condition calculating unit) calculates a gouging speed, a weaving frequency, and a current as gouging conditions, using an expression (equation) of a gouging removal depth.

As shown in FIG. 6, the weaving speed is a speed in a direction orthogonal to the gouging direction, and the gouging speed is a speed in the gouging direction. Assuming that the weaving speed is Vw, that the gouging speed is V, and that an amount of input heat is Q, a gouging removal depth y is represented by the following Expression (1). C1, C2, and C3 are experimentally obtained constants.

[Expression 1]

$$y = C1 + C2 \cdot Vw/V + C3 \cdot Q \qquad \text{Expression (1)}$$

Next, the image processing apparatus 16 then obtains the weaving frequency on a basis of the weaving width obtained in the weaving width/angle calculating step S7 and the weaving speed obtained from Expression (1).

The image processing apparatus 16 stores: the gouging conditions including the gouging speed, the weaving frequency/width, and the current obtained in the above; and the position/posture data calculated in the target position/torch posture calculating step S8, as the gouging teaching data into the teaching data storing apparatus 32.

Note that, in a case where the removal depth calculated in the weld reinforcement shape extracting/removal depth calculating step S6 is equal to or less than a given value, that is, in a case where gouging does not need to be performed, the image processing apparatus 16 proceeds to the gouging condition calculating step S9, and sets a gouging condition for minimizing the removal depth. The image processing apparatus 16 sets gouging conditions such that the current decreases to a predetermined value and that the gouging speed increases to a predetermined value. If such gouging conditions are set, the plasma gouging torch 13 operates in gouging work to be performed thereafter so as not to perform the gouging (so as to perform minimum gouging) and not to make the arc discontinuous.

In a pass division determining step S10, the image processing apparatus 16 determines whether or not the pass sequence is divided in the pass sequence selecting step S5. If determining that the pass sequence is divided (YES in Step S10), the image processing apparatus 16 returns to the weld reinforcement shape extracting/removal depth calculating step S6, and performs the weld reinforcement shape extracting/removal depth calculating step S6 to the gouging condition calculating step S9 on a pass sequence on which Step S6 to Step S9 have not been performed.

Meanwhile, if determining that the pass sequence is not divided (NO in Step S10), the image processing apparatus 16 determines whether or not another teaching point exists, in a teaching point determining step S11. If determining that another teaching point exists (YES in Step S11), the image processing apparatus 16 returns to the motion axis controlling step S2, and performs Step S2 to Step S10 on every teaching point.

Meanwhile, if the image processing apparatus 16 determines that another teaching point does not exist (NO in Step S11), the robot controlling apparatus 17 performs automatic gouging while controlling axial motions of the articulated robot 12 and the slider apparatus 11 and the gouging power supply, in accordance with the gouging teaching data and the like stored in the teaching data storing apparatus 32, in a robot controlling step S12.

As an example, bead shaping was performed on the blade welded portion of the hydraulic turbine runner 3, using conditions shown in FIG. 7. FIG. 8A is a graph showing a cross-sectional shape (solid line) and a designated shape (dotted line) before gouging of the blade welded portion, and FIG. 8B is a graph showing a cross-sectional shape (solid line) and a designated shape (dotted line) after the gouging thereof.

Plasma gouging was performed on the weld bead shown in FIG. 8A using the fixed conditions shown in FIG. 7 and the gouging conditions obtained from Expression (1). As a result, the weld reinforcement portion was favorably shaped as shown in FIG. 8B.

The weld bead shaping apparatus 1 and the weld bead shaping method according to the first embodiment configured as described above can achieve automatic weld bead shaping with high precision, regardless of a size and structural complexity of an object to be shaped. That is, the weld bead shaping apparatus 1 can measure the shape of the object to be shaped with excellent precision by means of the shape sensor 14, and can acquire the gouging teaching data such as the gouging conditions and the target position/torch posture. Further, the weld bead shaping apparatus 1 can automatically perform continuous gouging within a given range by means of the motion axis controlling apparatus 31.

The weld bead shaping apparatus 1 and the weld bead shaping method calculate maximum weld reinforcements between adjacent ones of the intersection points or inflection points from the shape of the weld bead, and define an average value of the maximum weld reinforcements as the removal depth. Hence, the weld reinforcement can be favorably shaped without being excessively ground. Further, the weld bead shaping apparatus 1 and the weld bead shaping method can perform continuous shaping under calculated favorable gouging conditions. Hence, work steps and work time can be reduced.

The weld bead shaping apparatus 1 and the weld bead shaping method calculates a distance in a portion in which weld reinforcement is insufficient, and divides a gouging range in a case where the distance is equal to or more than a predetermined value. With this configuration, the weld bead shaping apparatus 1 and the weld bead shaping method can perform favorable shaping without excessive removal in the portion in which the weld reinforcement is insufficient.

Second Embodiment

A second embodiment of the weld bead shaping apparatus and the weld bead shaping method according to the present invention will be described with reference to the attached drawings.

Figure 9:
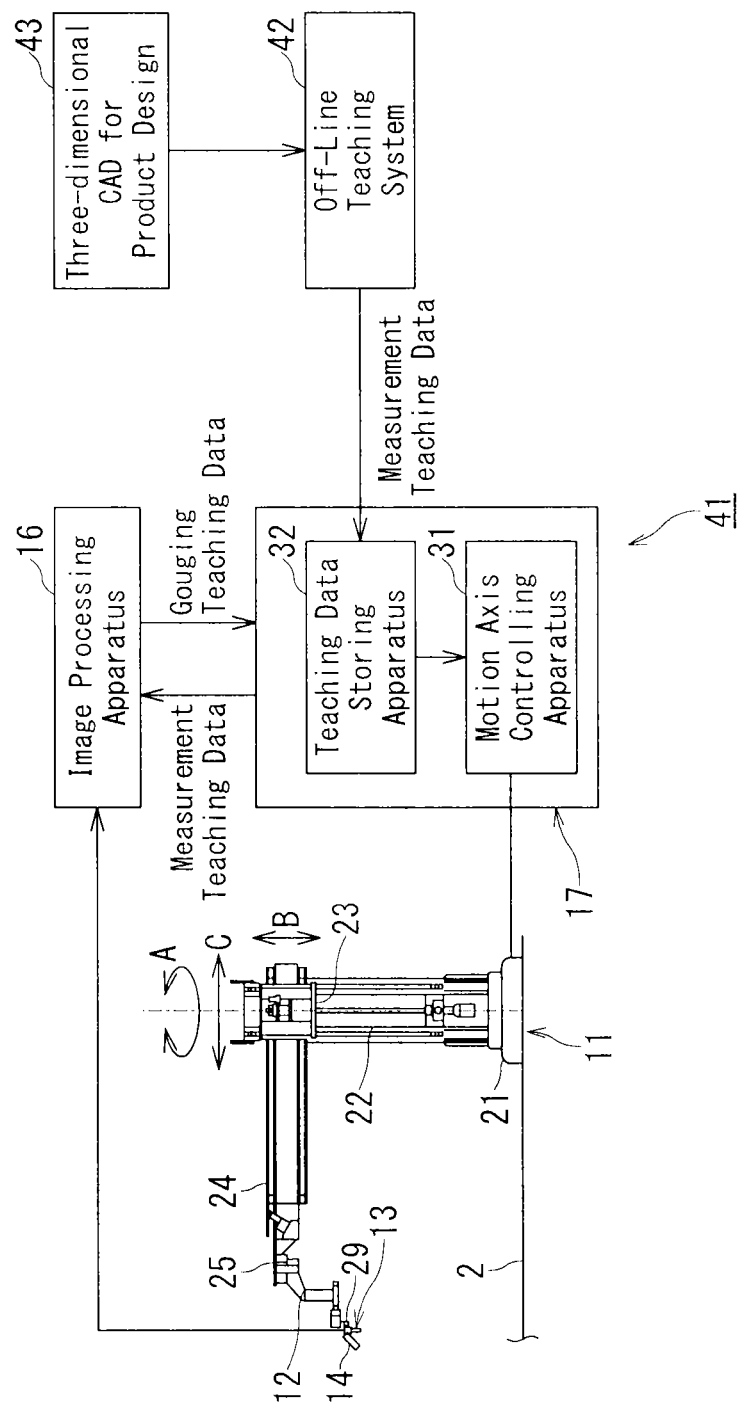
FIG. 9 is a configuration diagram of a weld bead shaping apparatus according to a second embodiment.

FIG. 9 is a configuration diagram of a weld bead shaping apparatus 41 according to the second embodiment.

The weld bead shaping apparatus 41 of the second embodiment is different from that of the first embodiment in that the teaching data that is stored into the teaching data storing apparatus 32 in the teaching data storing step is acquired from an off-line teaching system 42. Configurations and portions corresponding to those of the first embodiment are denoted by the same reference signs, and redundant description thereof is omitted.

The weld bead shaping apparatus 41 includes the slider apparatus 11, the articulated robot 12, the plasma gouging torch 13, the shape sensor 14, the image processing apparatus 16, the robot controlling apparatus 17, a three-dimensional CAD for product design 43, and the off-line teaching system 42.

The three-dimensional CAD for product design 43 creates three-dimensional shape data of an object to be shaped such as the hydraulic turbine runner 3. The off-line teaching system 42 is a system (digitizing apparatus) that performs teaching to the slider apparatus 11 and the articulated robot 12, in a virtual space on a computer screen.

Next, an action (function) of the weld bead shaping apparatus 41 and the weld bead shaping method according to the second embodiment are described.

Figure 10:
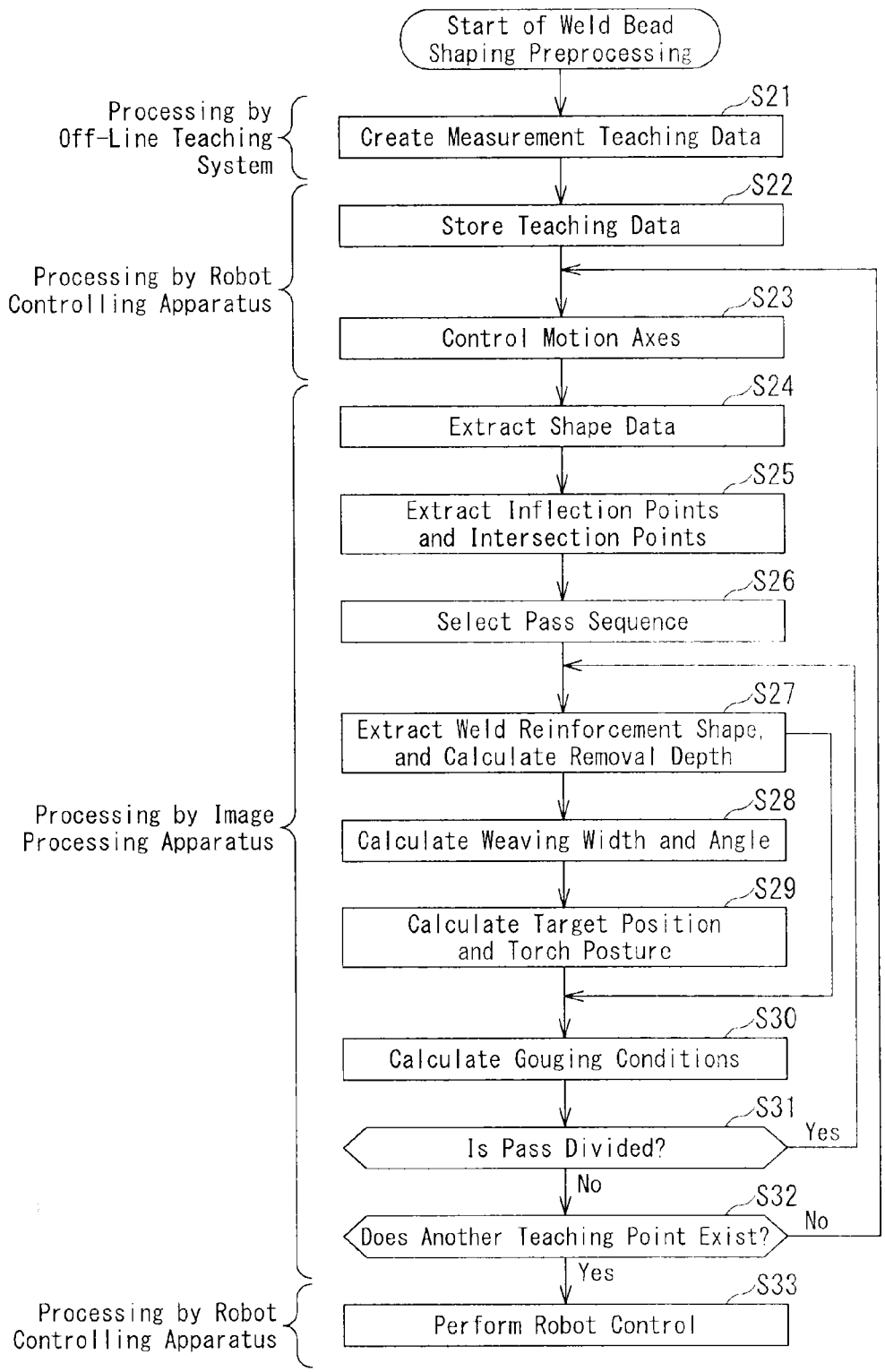
FIG. 10 is a flow chart for describing weld bead shaping preprocessing carried out by the weld bead shaping apparatus according to the second embodiment.

FIG. 10 is a flow chart for describing weld bead shaping preprocessing carried out by the weld bead shaping apparatus 41 according to the second embodiment.

The weld bead shaping preprocessing carried out by the weld bead shaping apparatus 41 is divided into a processing step (Step S21) carried out by the off-line teaching system 42, processing steps (Steps S22, S23, and S33) carried out by the robot controlling apparatus 17, and processing steps (Steps S24 to S32) carried out by the image processing apparatus 16.

In a measurement teaching step S21, the off-line teaching system 42 creates measurement teaching data of the object to be shaped on a basis of the three-dimensional shape data of the object to be shaped. The three-dimensional shape data is created using the three-dimensional CAD for product design 43, and is inputted to the off-line teaching system 42.

The off-line teaching system 42 places the inputted three-dimensional shape data of the object to be shaped in the virtual space on the computer, together with a pre-created three-dimensional model of the weld bead shaping apparatus 41 (the slider apparatus 11, the articulated robot 12, the shape sensor 14, and the plasma gouging torch 13). The off-line teaching system 42 calculates the measurement teaching data such that the shape sensor 14 (and the plasma gouging torch 13) are placed at a position and a direction (posture) passing through a center of an angle formed by the surface of the crown 5 or the band 6 and the surface of the blade 7, on a plane orthogonal to a gouging line of a welded portion of the object to be shaped expressed by the three-dimensional shape data.

The off-line teaching system 42 adds teaching data of an approach motion and a retraction motion with respect to the calculated position and posture. In this way, the off-line teaching system 42 adds a motion command to each teaching point, to thereby create the measurement teaching data.

In a teaching data storing step S22, the teaching data storing apparatus 32 stores the teaching data created in the measurement teaching step S21. A motion axis controlling step S23 to a robot controlling step S33 are substantially the same as the motion axis controlling step S2 to the robot controlling step S12 in the weld bead shaping preprocessing (FIG. 2) of the first embodiment, and hence detailed description thereof is omitted here.

In the weld bead shaping apparatus 1 and the weld bead shaping method according to the first embodiment, the operator operates the articulated robot 12 and the slider apparatus 11 using the operation apparatus provided to the robot controlling apparatus 17, to thereby input the teaching data. In comparison, in the weld bead shaping apparatus 41 and the weld bead shaping method according to the second embodiment, data digitized by the three-dimensional CAD for product design 43 and the off-line teaching system 42 is used as the teaching data, and is inputted to the articulated robot 12.

As a result, in addition to advantages produced by the first embodiment, the weld bead shaping apparatus 41 and the weld bead shaping method can eliminate the need for teaching work using an actual object to be shaped and an actual apparatus, and thus can reduce an amount of work and work time for weld bead shaping.

Third Embodiment

A third embodiment of the weld bead shaping apparatus and the weld bead shaping method according to the present invention is described with reference to the attached drawings.

Figure 11:
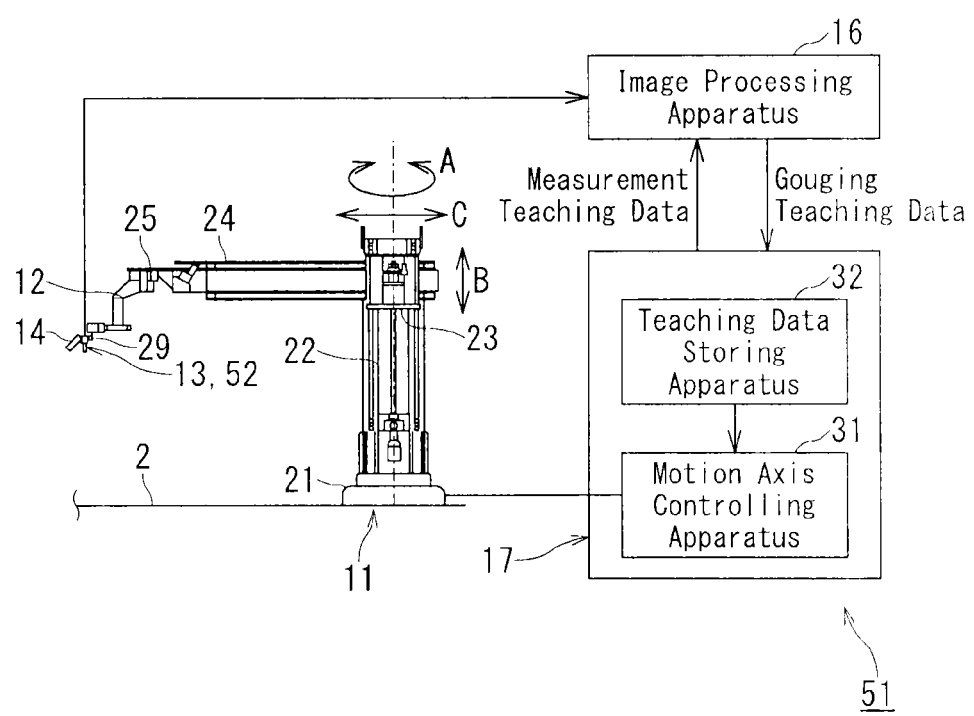
FIG. 11 is a configuration diagram of a weld bead shaping apparatus according to a third embodiment.

FIG. 11 is a configuration diagram of a weld bead shaping apparatus 51 according to the third embodiment.

The weld bead shaping apparatus 51 of the third embodiment is different from that of the first embodiment in that the weld bead shaping apparatus 51 further includes a welding torch 52, and performs not only gouging but also welding. Configurations and portions corresponding to those of the first embodiment are denoted by the same reference signs, and redundant description thereof is omitted.

The weld bead shaping apparatus 51 includes the slider apparatus 11, the articulated robot 12, the plasma gouging torch 13, the shape sensor 14, the image processing apparatus 16, the robot controlling apparatus 17, and the welding torch 52.

A position and posture of the welding torch 52 are adjusted by: the articulated mechanism of the articulated robot 12; and position adjustment achieved by vertical and horizontal movements of the slider apparatus 11 and a rotation thereof about the vertical axis. Any of the plasma gouging torch 13 and the welding torch 52 is selected and used as appropriate in accordance with work carried out by the weld bead shaping apparatus 51.

Next, an action of the weld bead shaping apparatus 51 and the weld bead shaping method according to the third embodiment are described.

Figure 12:
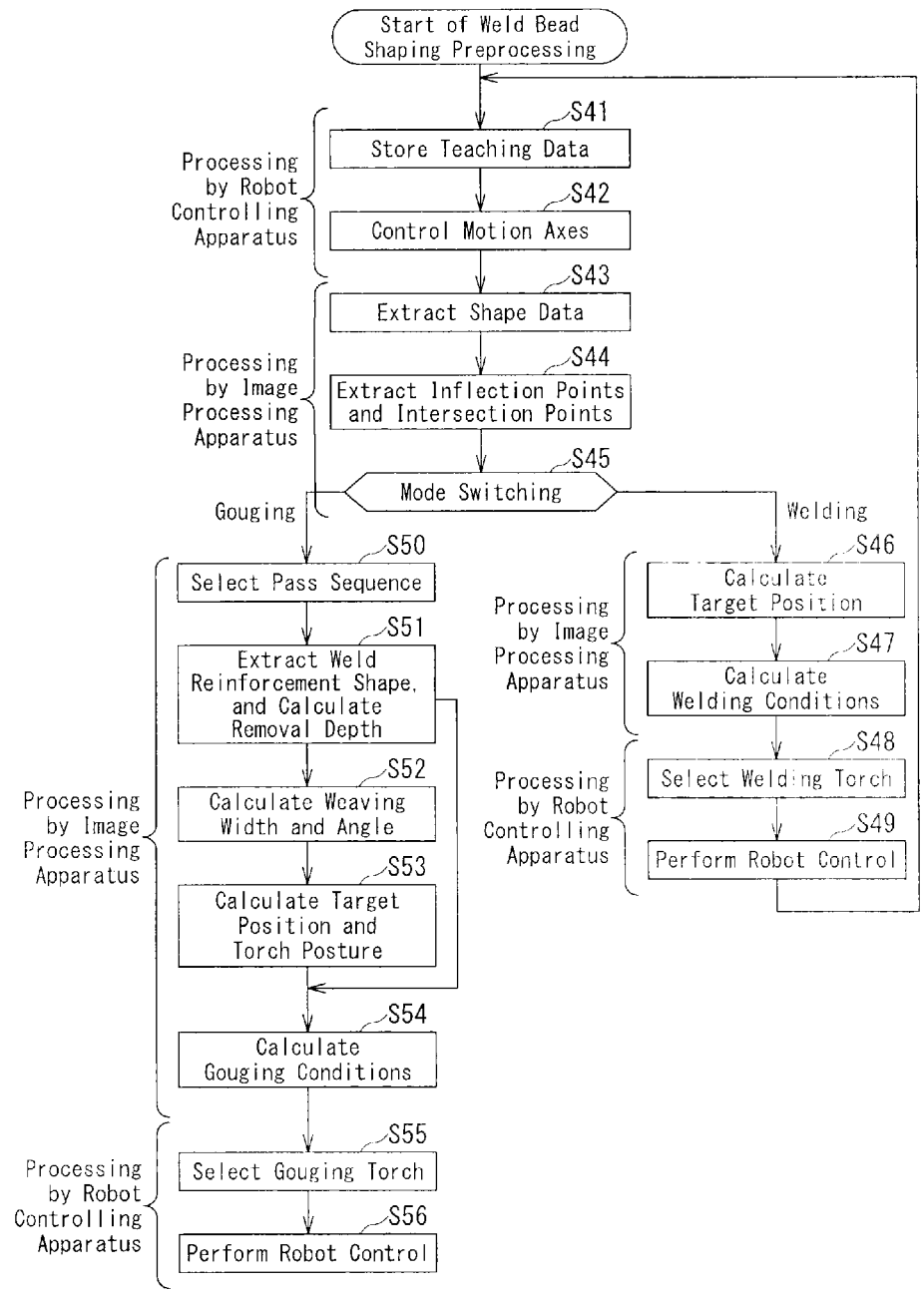
FIG. 12 is a flow chart for describing weld bead shaping preprocessing carried out by the weld bead shaping apparatus according to the third embodiment.

FIG. 12 is a flow chart for describing weld bead shaping preprocessing carried out by the weld bead shaping apparatus 51 according to the third embodiment.

The weld bead shaping preprocessing carried out by the weld bead shaping apparatus 51 is divided into processing steps (Steps S41, S42, S48, S49, S55, and S56) carried out by the robot controlling apparatus 17 and processing steps (Steps S43 to S47 and S50 to S54) carried out by the image processing apparatus 16.

A teaching data storing step S41 to a shape data extracting step S43 are substantially the same as the teaching data storing step S1 to the shape data extracting step S3 in the weld bead shaping preprocessing (FIG. 2) of the first embodiment, and hence detailed description thereof is omitted here.

In an inflection point/intersection point extracting step S44, the image processing apparatus 16 superimposes the shape data extracted in the shape data extracting step S43 and the designated shape on an image. The image processing apparatus 16 extracts, as intersection points, points at which the shape data and the designated shape intersect with each other. The image processing apparatus 16 further extracts, as inflection points, apexes of valley portions of the weld bead on the shape data.

Figure 13:
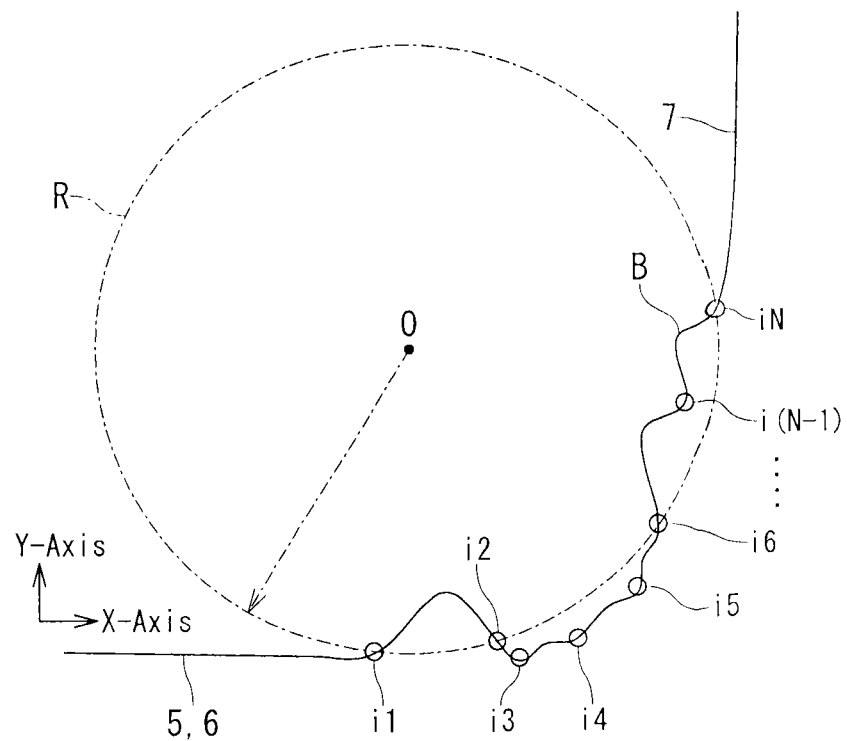
FIG. 13 is an explanatory view for describing a relation of shape data of a weld bead, a designated shape, and respective surfaces of a crown, a band, and a blade.

FIG. 13 is an explanatory view for describing a relation of the shape data B of the weld bead, the designated shape R, and the respective surfaces of the crown 5, the band 6, and the blade 7.

The image processing apparatus 16 extracts the intersection point i1, the intersection point i2, the intersection point i6, and the intersection point iN that are intersection points between the shape data B extracted in the shape data extracting step S43 and the designated shape R. The image processing apparatus 16 extracts apexes (which are convex toward a side opposite to the center point O of the designated shape R) of valley portions of the weld bead on the shape data B, as the inflection point i3 to the inflection point i5 and the inflection point i(N−1). The image processing apparatus 16 extracts apexes of valley portions as inflection points, regardless of whether the apexes are inside or outside of the designated shape R.

Numbers of i1, i2, i3 . . . i(N−1), and iN (N: the total number of the extracted inflection points and intersection points) are assigned to the intersection points and inflection points extracted at this time, in ascending order of X-axial value within the shape data B.

In a mode switching step S45, the image processing apparatus 16 (mode switching unit) determines whether to perform gouging or perform welding. Specifically, the image processing apparatus 16 compares the shape data extracted in the shape data extracting step S43 with the designated shape. In a case where an inflection point is outside of the designated shape, that is, where the weld bead is insufficient for the designated shape, the image processing apparatus 16 determines to perform the welding. In a case where an inflection point is inside of the designated shape, that is, where the amount of weld reinforcement is sufficient, the image processing apparatus 16 determines to perform the gouging.

For example, in a case as shown in FIG. 13, the inflection point i3 to the inflection point i5 at which the weld head (shape data B) is insufficient for the designated shape exist, and hence the image processing apparatus 16 determines to perform the welding.

If determining to perform the welding, the image processing apparatus 16 defines, as a target position, an inflection point outside of the designated shape among the inflection points extracted in the inflection point/intersection point extracting step S44, in a target position calculating step S46. In a case where a plurality of inflection points exist outside of the designated shape, the image processing apparatus 16 performs the target position calculating step S46 to a robot controlling step S49 on each of the plurality of inflection points.

In a welding condition calculating step S47, the image processing apparatus 16 determines: welding conditions including a welding current, a welding voltage, a welding speed, and a weaving frequency/amplitude, which are selected such that an overlap shape leading to a lack of penetration does not occur at a target position; the target position; and a torch posture. The image processing apparatus 16 stores the calculated welding conditions, target position, and torch posture as welding teaching data into the teaching data storing apparatus 32.

In a welding torch selecting step S48, the robot controlling apparatus 17 selects the welding torch 52 as a torch to be attached to the leading end of the articulated robot 12, and makes switching to the welding torch 52. In a robot controlling step S49, the robot controlling apparatus 17 performs the welding while controlling motions of the articulated robot 12 and the like and a welding power supply, on a basis of the welding teaching data stored in the teaching data storing apparatus 32. After performing the welding on the basis of the calculated welding teaching data, the robot controlling apparatus 17 returns to the teaching data storing step S41, and the motion axis controlling step S42 to the mode switching step S45 are performed again.

If determining to perform the gouging in the mode switching step S45, the image processing apparatus 16 proceeds to a pass sequence selecting step S50. The pass sequence selecting step S50 to a gouging condition calculating step S54 are substantially the same as the pass sequence selecting step S5 to the gouging condition calculating step S9 in the weld bead shaping preprocessing (FIG. 2) of the first embodiment, and hence detailed description thereof is omitted here.

In a gouging torch selecting step S55, the robot controlling apparatus 17 selects the plasma gouging torch 13 as a torch to be attached to the leading end of the articulated robot 12, and makes switching to the plasma gouging torch 13. In a robot controlling step S56, the robot controlling apparatus 17 performs the gouging while controlling motions of the articulated robot 12 and the like and the gouging power supply, on a basis of the gouging teaching data stored in the teaching data storing apparatus 32.

In addition to advantages produced by the first embodiment, the weld bead shaping apparatus 51 and the weld bead shaping method according to the third embodiment configured as described above can perform not only the gouging but also the welding on a portion in which weld reinforcement is insufficient. Hence, the weld bead shaping apparatus 51 and the weld bead shaping method can achieve automatic weld bead shaping with high precision, regardless of a size and structural complexity of an object to be shaped.

Note that the present invention is not limited to the above-mentioned embodiments without any change, and can be carried out in various embodiments in addition to the above-mentioned embodiments in practical situations. Various omissions, additions, replacements, and modifications can be made within a range not departing from the gist of the present invention. Such embodiments and modifications thereof are included in the scope and gist of the present invention, and are also included in the invention described in CLAIMS and a range equivalent thereto.

REFERENCE SIGNS LIST 1, 41, 51 weld bead shaping apparatus
11 slider apparatus
12 articulated robot
13 plasma gouging torch
14 shape sensor
16 image processing apparatus
17 robot controlling apparatus
29 nozzle
31 motion axis controlling apparatus
32 teaching data storing apparatus
42 off-line teaching system
43 three-dimensional CAD for product design
52 welding torch

The invention claimed is:

1. A weld bead shaping apparatus comprising:
a shape data extracting unit that extracts shape data of an object to be shaped on which a weld bead existing on the object is formed, from a measurement result obtained by a shape sensor that measures a shape of the object to be shaped;
a weld reinforcement shape extracting/removal depth calculating unit that calculates a weld reinforcement shape of the weld bead from a difference between the shape data and a preset designated shape of the object to be shaped, and calculates a removal depth by which gouging is performed using a gouging torch, on a basis of the weld reinforcement shape;
a target position/torch posture calculating unit that calculates a target position and a posture of the gouging torch on a basis of the weld reinforcement shape and the removal depth;
a gouging condition calculating unit that calculates a gouging condition on the basis of the weld reinforcement shape and the removal depth;
a driving apparatus that drives the gouging torch and the object to be shaped and a controlling apparatus that controls the gouging torch, on a basis of: the target position and the posture of the gouging torch that are calculated by the target position/torch posture calculating unit; and the gouging condition calculated by the gouging condition calculating unit;
a pass sequence selecting unit that compares the shape data with the designated shape, and divides a track of the gouging in a case where there is a portion in which reinforcement of the weld bead is insufficient for the designated shape;
an inflection point/intersection point extracting unit that extracts, as an intersection point, a point at which the shape data and the designated shape intersect with each other, and extracts, as an inflection point, an apex of a valley portion of the weld bead on the shape data that is excessively reinforced with reference to the designated shape, wherein in a case where a number of the intersection points is more than two, the pass sequence selecting unit calculates a distance between adjacent ones of the intersection points, in a case where the distance is more than a predetermined value, the pass sequence selecting unit divides the track of the gouging, and in a case where the distance is equal to or less than the predetermined value, the pass sequence selecting unit does not divide the track of the gouging.

2. The weld bead shaping apparatus according to claim 1, further comprising an inflection point/intersection point extracting unit that extracts, as an intersection point, a point at which the shape data and the designated shape intersect with each other, and extracts, as an inflection point, an apex of a valley portion of the weld bead on the shape data that is excessively reinforced with reference to the designated shape, wherein the weld reinforcement shape extracting/removal depth calculating unit calculates the weld reinforcement shape on a basis of a difference between the shape data and the designated shape, between adjacent ones of the intersection points or the inflection points, calculates a maximum weld reinforcement in each weld reinforcement shape, and calculates the removal depth using at least an average value of the maximum weld reinforcements.

3. The weld bead shaping apparatus according to claim 1, wherein the driving apparatus includes an articulated robot, and
the gouging torch and the shape sensor are attached to the articulated robot with a relative position therebetween being fixed.

4. The weld bead shaping apparatus according to claim 1, wherein the driving apparatus includes a slider apparatus having a plurality of shafts, and
an articulated robot is provided to any one of the shafts of the slider apparatus.

5. The weld bead shaping apparatus according to claim 1, further comprising:

a welding torch for welding the object to be shaped on which the weld bead is formed; and
a mode switching unit that performs the welding using the welding torch in a case where the weld bead is insufficient for the designated shape.

6. The weld bead shaping apparatus according to claim 1, wherein the controlling apparatus acquires teaching data to the driving apparatus by means of an off-line teaching system.

7. The weld bead shaping apparatus according to claim 1, wherein the gouging torch is a plasma gouging torch.

8. The weld bead shaping apparatus according to claim 1, wherein the gouging torch includes a nozzle that jets plasma gas for gouging the weld bead and jets cooling gas for removing slag generated during the gouging.

9. A weld bead shaping method comprising:

a shape measuring step of measuring a shape of an object to be shaped;
a shape data extracting step of extracting shape data of the object to be shaped, on a basis of a measurement result obtained in the shape measuring step;
a weld reinforcement shape extracting/removal depth calculating step of calculating a weld reinforcement shape of a weld bead existing on the object from a difference between the shape data and a preset designated shape of the object to be shaped, and calculating a removal depth by which gouging is performed, from the weld reinforcement shape;
a target position/torch posture calculating step of calculating a target position and a posture of a gouging torch on a basis of the weld reinforcement shape and the removal depth;
a gouging condition calculating step of calculating a gouging condition on the basis of the weld reinforcement shape and the removal depth;
a controlling step of controlling a driving apparatus that drives the gouging torch for the gouging and the object to be shaped, on a basis of: the target position and the posture of the gouging torch that are calculated in the target position/torch posture calculating step; and the gouging condition calculated in the gouging condition calculating step,
a pass sequence selecting step that compares the shape data with the designated shape, and divides a track of the gouging in a case where there is a portion in which reinforcement of the weld bead is insufficient for the designated shape;
an inflection point/intersection point extracting step that extracts, as an intersection point, a point at which the shape data and the designated shape intersect with each other, and extracts, as an inflection point, an apex of a valley portion of the weld bead on the shape data that is excessively reinforced with reference to the designated shape, wherein
in a case where a number of the intersection points is more than two, the pass sequence selecting step calculates a distance between adjacent ones of the intersection points,
in a case where the distance is more than a predetermined value, the pass sequence selecting step divides the track of the gouging, and
in a case where the distance is equal to or less than the predetermined value, the pass sequence selecting step does not divide the track of the gouging.

\* \* \* \* \*